(12) United States Patent
Hauser et al.

(10) Patent No.: US 12,716,484 B2
(45) Date of Patent: Aug. 25, 2026

(54) ACCUMULATOR PLATE DEVICE

(71) Applicant: RevMax Performance, LLC, Charlotte, NC (US)

(72) Inventors: Thomas Hauser, Charlotte, NC (US); Steven Hilton, Clover, SC (US)

( * ) Notice: Subject to any disclaimer, the term of this patent is extended or adjusted under 35 U.S.C. 154(b) by 40 days.

(21) Appl. No.: 18/918,339

(22) Filed: Oct. 17, 2024

(65) Prior Publication Data

US 2025/0129844 A1 Apr. 24, 2025

Related U.S. Application Data

(60) Provisional application No. 63/591,524, filed on Oct. 19, 2023.

(51) Int. Cl.
*F16H 61/00* (2006.01)

(52) U.S. Cl.
CPC ..... *F16H 61/0025* (2013.01); *F16H 61/0009* (2013.01); *F16H 2061/0034* (2013.01); *F16H 2061/0062* (2013.01)

(58) Field of Classification Search
CPC ............... F16H 61/00; F16H 2061/009; F16H 61/0025; F16H 2061/0034; F16H 2061/0062; F16H 2061/0065; F16H 61/067; F16H 2061/305; F16D 48/02; F16D 2048/0203
See application file for complete search history.

(56) References Cited

U.S. PATENT DOCUMENTS 7,762,918 B2 * 7/2010 Younger ............... F16H 61/067 475/129
7,886,416 B1 * 2/2011 Greene ............... F16H 61/0009 29/401.1

* cited by examiner

*Primary Examiner* — Richard M Lorence
(74) *Attorney, Agent, or Firm* — Brennan, Manna & Diamond, LLC

(57) ABSTRACT

An accumulator plate device attachable to a transmission valve body. The accumulator plate device is stronger than existing accumulator plates and is able to resist bending and breaking forces from valve and spring activation pressures. The accumulator plate device employs novel securing features integrated into or attached to the accumulator plate device at various locations designed to resist the higher pressures. The securing features are designed to engage specific locations on a lip of a lateral edge of the transmission valve body to prevent damage to the accumulator plate device from mechanical stress on the accumulator plate device from the hydraulic pressure inside the transmission valve body.

19 Claims, 7 Drawing Sheets

100
150
154
158
156
144
140
142
152
120
W
114
116
118
110
122
106
102
104
101
108

ACCUMULATOR PLATE DEVICE

CROSS-REFERENCE TO RELATED APPLICATION

The present application claims priority to, and the benefit of, U.S. Provisional Application No. 63/591,524, which was filed on Oct. 19, 2023 and is incorporated herein by reference in its entirety.

FIELD OF THE INVENTION

The present invention generally relates to automotive transmission systems. More specifically, the present invention relates to an accumulator plate for use with a transmission valve body device. Accordingly, the present specification makes specific reference thereto. However, it is to be appreciated that aspects of the present invention are also equally amenable to other like applications, devices and methods of manufacture.

BACKGROUND

An automotive transmission system is a key component of a vehicle drivetrain that transfers power from the engine to the wheels. The transmission system is responsible for adjusting the gear ratio between the engine and the drive wheels as the vehicle speeds up and slows down. The most common type of automatic transmission is the hydraulic automatic transmission. A hydraulic automatic transmission uses planetary gearsets instead of the manual transmission's design of gears lined up along input, output and intermediate shafts. To change gears, the hydraulic automatic uses a combination of internal clutches, friction bands or brake packs. These devices are used to lock certain gears, thus setting which gear ratio is in use at a given time.

These systems use automatic transmission fluid, which is pressurized by a pump and then directed to the appropriate bands and clutches to obtain the required gear ratio. The automatic transmission fluid provides lubrication, corrosion prevention, and a hydraulic medium to transmit the power required to operate the transmission. The main pump which pressurizes the automatic transmission fluid is normally a gear pump mounted between the torque converter and the planetary gear set. The input for the main pump is connected to the torque converter housing, which in turn is bolted to the engine's flexplate, so the pump provides pressure whenever the engine is running.

The transmission valve body is a major transmission component that diverts transmission fluid to the appropriate channels and areas. The valve body is located inside the transmission and is responsible for moving parts of the transmission. This is done through hydraulic circuits controlled by a system of valves and solenoids that direct the flow. It receives pressurized fluid from the main pump and consists of several spring-loaded valves, check balls, and servo pistons. Valves within the unit open and close to direct transmission fluid to the appropriate area to make gear changes occur.

The valve body contains a collection of passages that route fluid to specific locations inside the transmission. Valves and check balls block or allow fluid flow to the different passages as needed. Many of the valves used in modern transmissions are electronically-controlled solenoid valves. The valve body is usually attached to the case with bolts, and it can be made of either cast aluminum or cast iron. While the valve body doesn't fail often, it's still a part susceptible to wear and tear. A faulty transmission valve body can show symptoms such as harsh shifts, incorrect shifting, torque converter engagement issues, and an illuminated check engine light.

An accumulator plate in a transmission is a component that helps control shift feel by cushioning the fluid pressure that applies the clutch, brake, or band. This allows the clutch, brake, or band to engage gradually, instead of slamming on and rattling parts. The accumulator component is a spring loaded device designed to cushion the fluid pressure shock when transmission components are activated. Accumulator pistons and springs are designed to absorb the applied pressure. The accumulator plate attaches to the valve body assembly to retain the fluid within the valve body. However, existing accumulator plates are often not designed to withstand the impact of accumulator pistons in modern high performance transmission systems. These standard accumulator plates are prone to bending or breaking due to the activation pressure from the valves and springs the accumulator plate retains and holds in place.

Therefore, there exists a long-felt need in the art for an improved accumulator plate device. There is also a long-felt need in the art for an accumulator plate device designed to withstand the impact of accumulator pistons in modern high performance transmission systems. Further, there is a long-felt need in the art for an accumulator plate device that can better resist bending or breaking forces from valve and spring activation pressures. Finally, there is a long-felt need in the art for an accumulator plate device with additional securing features to keep the accumulator plate in place on a transmission valve body.

In this manner, the improved accumulator plate device of the present invention accomplishes all of the foregoing objectives, thereby providing an easy solution to resist modern transmission system pressures. A primary feature of the present invention is an improved accumulator plate device having novel securing features on the accumulator plate designed to resist the higher pressures. Finally, the improved accumulator plate device of the present invention is stronger than existing accumulator plates that is less prone to bending and breaking due to activation pressure.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises an accumulator plate device. The accumulator plate device is configured for use with a valve body of a transmission. The accumulator plate device comprises an elongated plate body and a plurality of hook members. The accumulator plate device is configured to attach to the valve body and absorb applied pressure from accumulator piston and spring impact to the elongated plate body.

The valve body comprises a lateral face, a plurality of bore holes penetrating the lateral face, and a plurality of mounting holes within the lateral face. The lateral face comprises a lip extending upward from the lateral face. An accumulator assembly comprises a plurality of springs and a plurality of clutch accumulator pistons. Each spring is paired with one of the clutch accumulator pistons and are together positional within one of the bore holes in the lateral face of the valve body.

The elongated plate body comprises a front side, a back side, a top edge, a bottom edge, and a pair of side edges. The elongated plate body further comprises a plurality of mounting holes, and a plurality of access openings. The back side of the elongated plate body is configured to abut the lateral face of the valve body.

The plurality of hook members extend out of a top edge of the elongated plate body at a plurality of hook member attachment points. The plurality of hook members may alternatively also extend out of the side edges. The plurality of hook members are configured to fit over the lip of the lateral face of the valve body to secure the elongated plate body to the lateral face of the valve body.

The accumulator plate device may further comprise a plurality of fasteners. The plurality of fasteners are insertable within the plurality of mounting holes of the elongated plate body. The plurality of fasteners are then securable within the plurality of mounting holes within the lateral face of the valve body to further secure the elongated plate body to the lateral face of the valve body.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
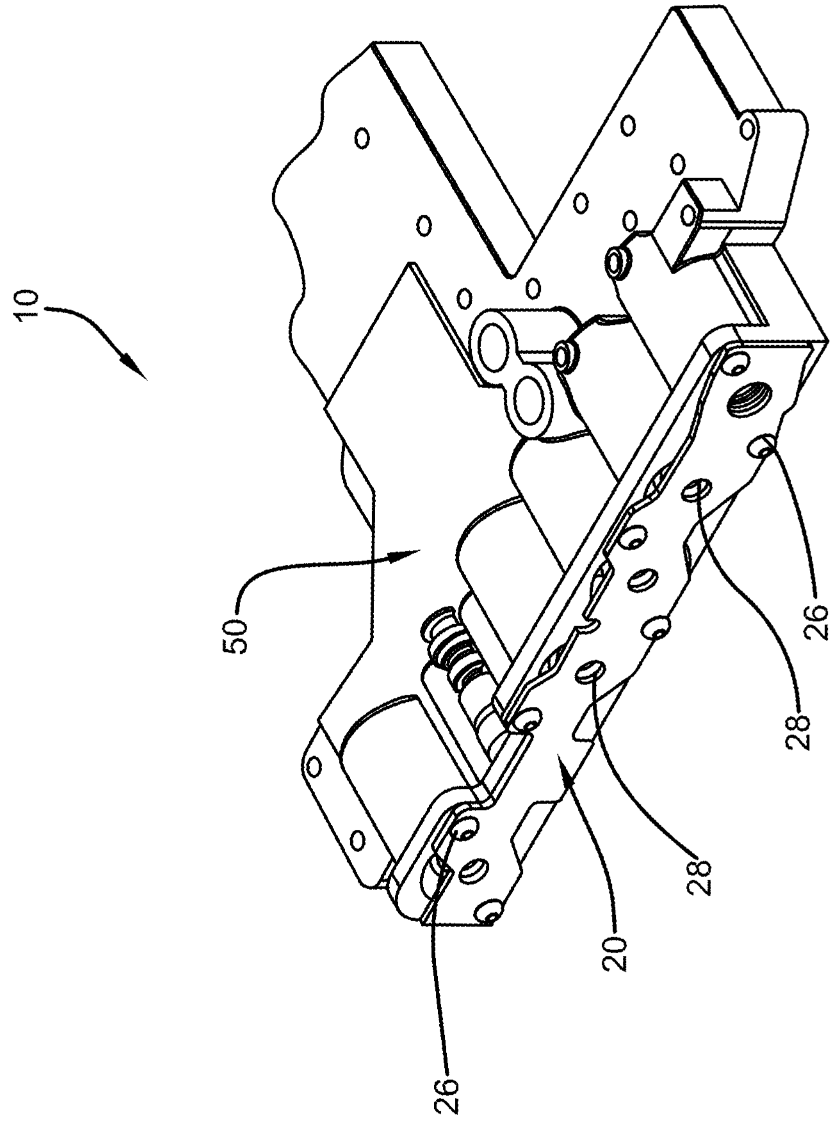
FIG. 1 illustrates a perspective view of one embodiment of a prior art accumulator plate device secured to a valve body of a transmission in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

Standard accumulator plates are prone to bending or breaking due to the activation pressure from the valves and springs the accumulator plate retains and holds in place. Therefore, there exists a long-felt need in the art for an improved accumulator plate device. The present invention describes an accumulator plate device that is stronger than existing original manufacture or replacement part accumulator plates and that is less prone to bending and breaking due to activation pressures.

The present invention, in one exemplary embodiment, is an improved accumulator plate device for a transmission valve body which is stronger and contains locking features to resist bending from use which is present with prior art versions. The accumulator plate device provides an accumulator plate for a transmission valve body which is stronger and is comprised of locking features to resist bending from use. The accumulator plate device is stronger in design by increasing the cross-sectional area, uses high-grade materials, and is comprised of formed-in hooks which wrap around a lip inherent in the construction of the valve body. The formed-in hooks help support the plate when pressures are applied from the valves and associated springs holding the valves in a starting position. The formed-in hooks help prevent excessive deflection of the accumulator plate by engaging the underside of a formed-in lip feature of the transmission valve body housing.

Figure 2:
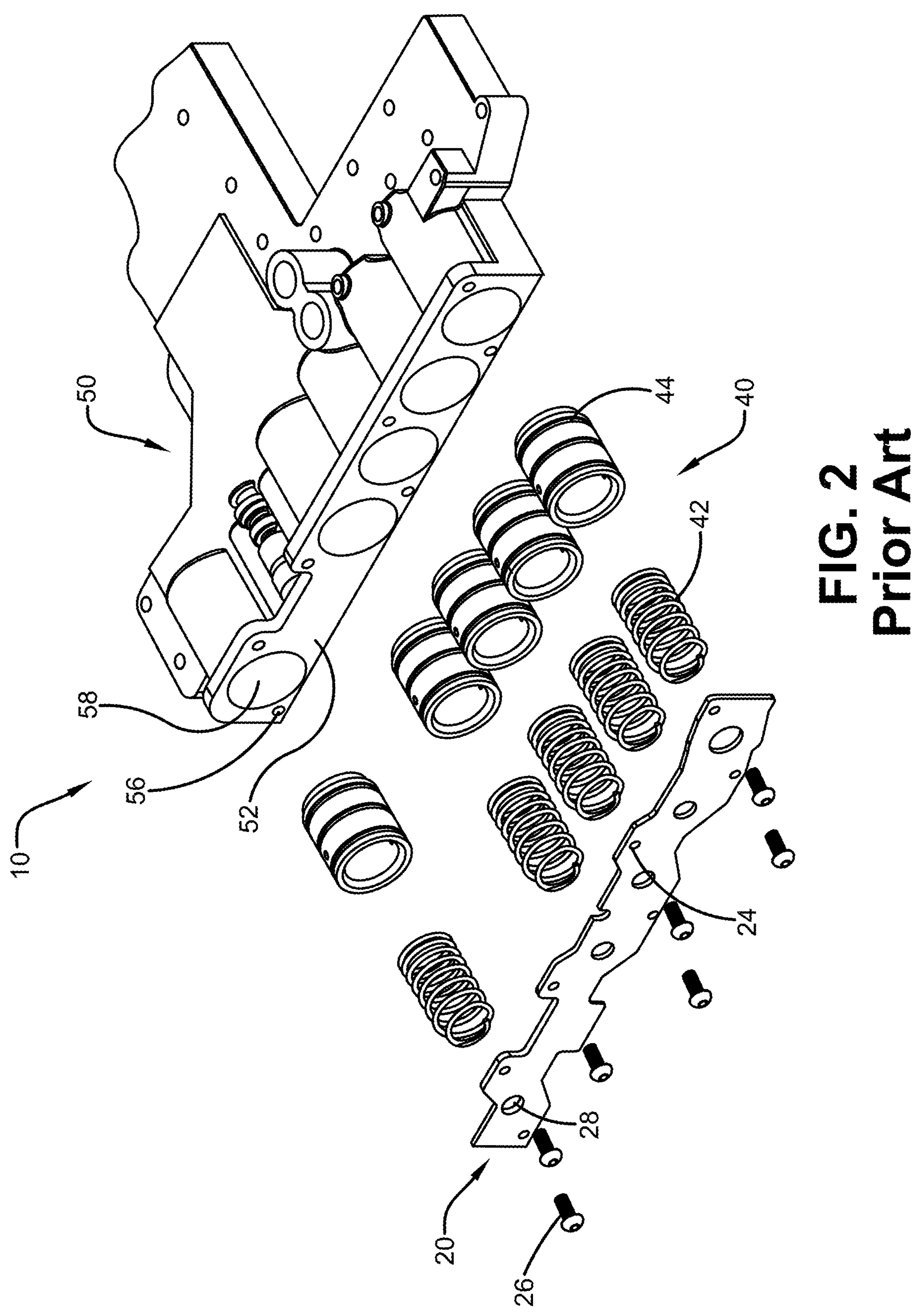
FIG. 2 illustrates an exploded view of the prior art accumulator plate device and the valve body in accordance with the disclosed architecture.

Referring initially to the drawings, FIGS. 1 and 2 illustrate a prior art valve body assembly 10. The prior art valve body assembly 10 comprises a valve body 50 and a plurality of accumulator assemblies 40. The valve body 50 comprises a lateral face 52, a plurality of bore holes 58 penetrating the lateral face 52, and a plurality of mounting holes 56. Each accumulator assembly 40 comprises a spring 42 and a piston 44. Each accumulator assembly 40 is positional within one of the bore holes 56 in the lateral face 52 of the valve body 50.

The prior art valve body assembly 10 further comprises an original equipment manufactured accumulator plate or a replacement accumulator plate 20. The original equipment manufactured accumulator plate or the replacement accumulator plate 20 comprises a plurality of mounting holes 24, a plurality of fasteners 26, and a plurality of access openings 28. The original equipment manufactured accumulator plate or a replacement accumulator plate 20 is secured to the lateral face 52 of the valve body 50 to help retain each accumulator assembly 40 within the respective bore hole 58.

As illustrated in FIGS. 3-7, the present invention, in one exemplary embodiment, comprises an accumulator plate device 100. The accumulator plate device 100 is configured for use with a valve body 150 of a transmission for a vehicle. The accumulator plate device 100 comprises an elongated plate body 101 and a plurality of hook members 120. The accumulator plate device 100 is configured to attach to the valve body 150 and to absorb applied pressure from recurring accumulator piston and spring impacts.

Figure 3:
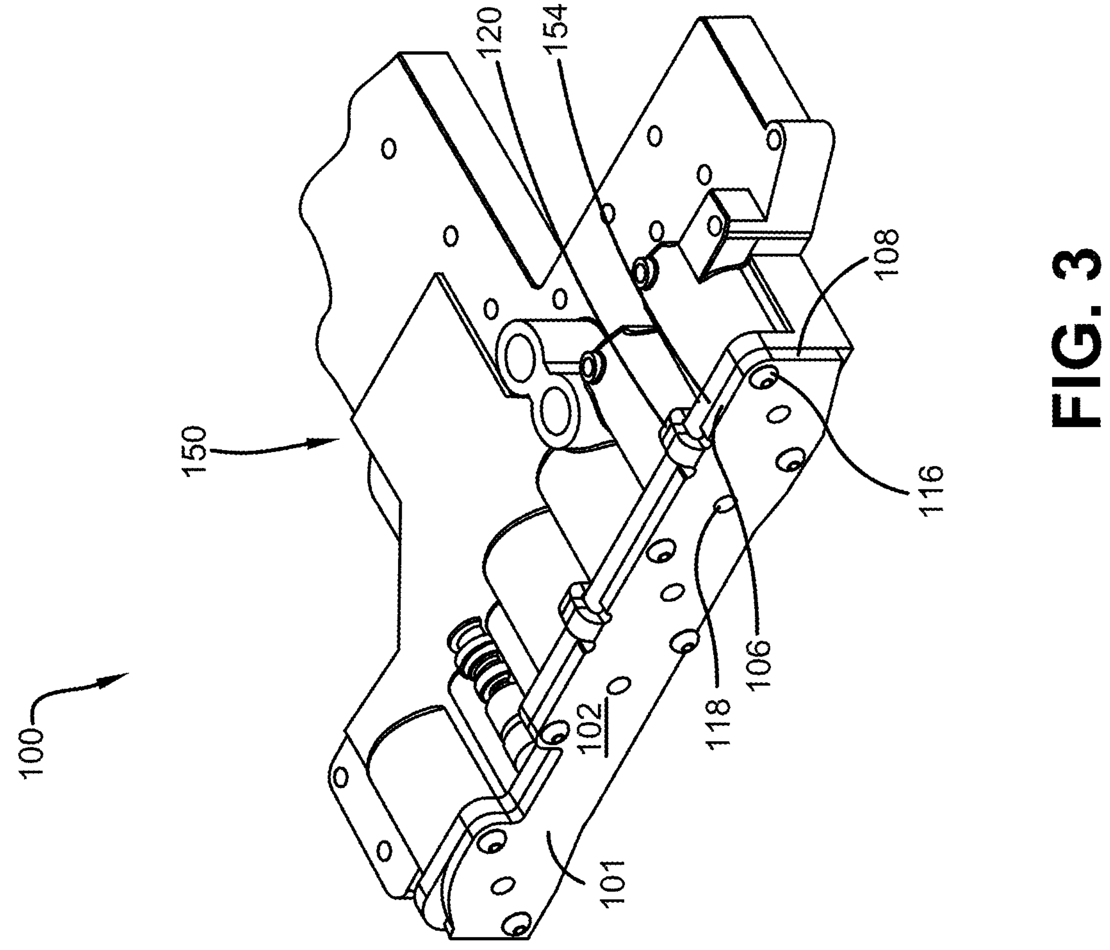
FIG. 3 illustrates a perspective view of one embodiment of an accumulator plate device of the present invention secured to a valve body of a transmission in accordance with the disclosed architecture.
Figure 4:
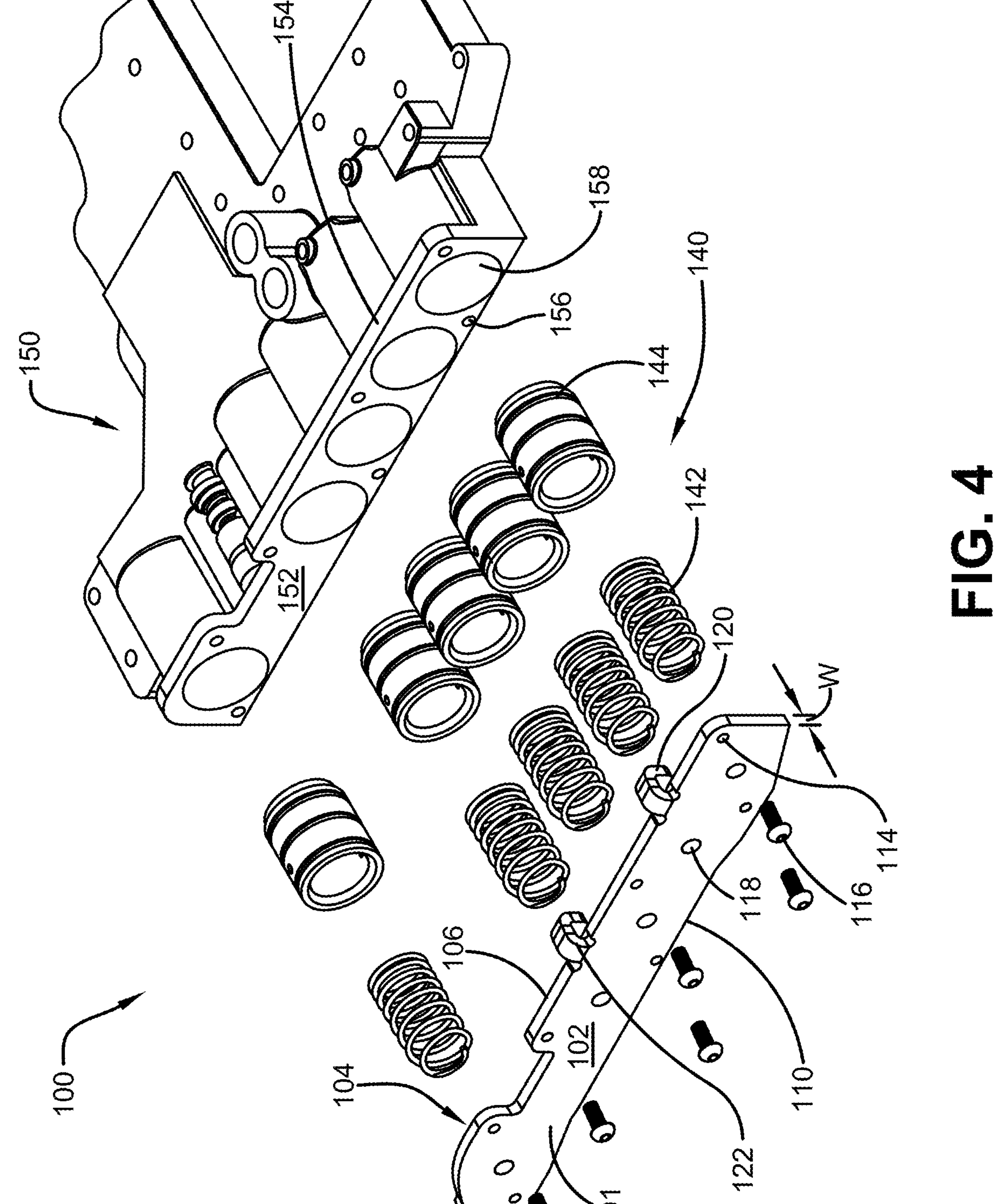
FIG. 4 illustrates an exploded view of the accumulator plate device of the present invention and the valve body in accordance with the disclosed architecture.
Figure 6:
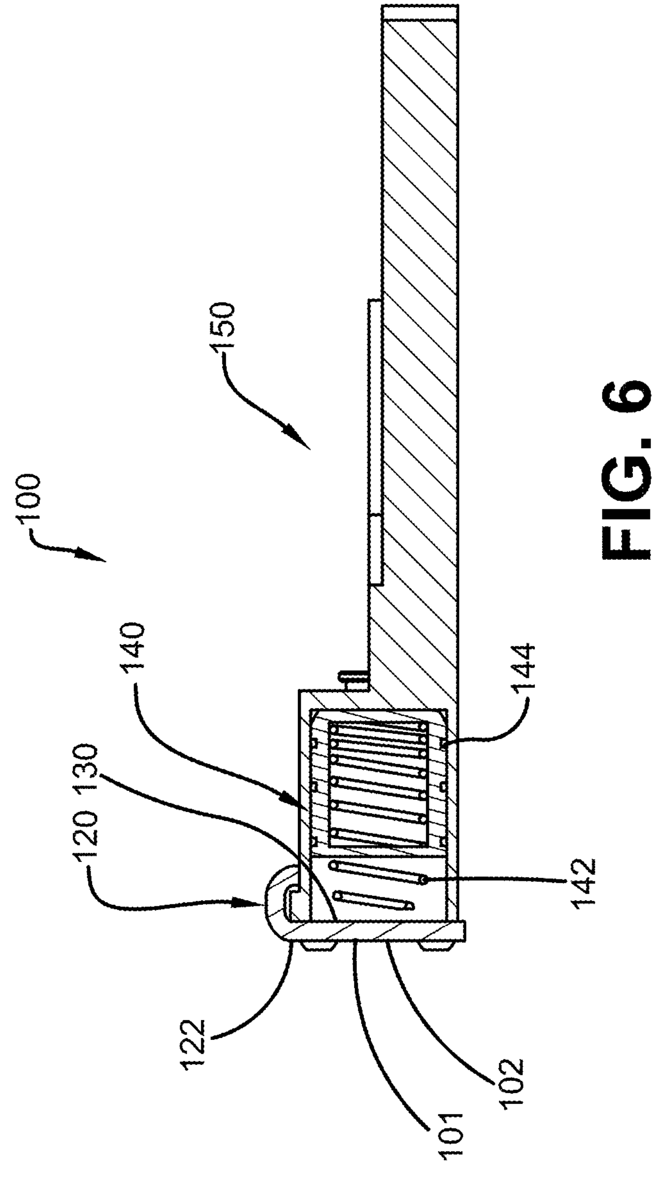
FIG. 6 illustrates a side cross-sectional view of one embodiment of the accumulator plate device of the present invention secured to the valve body in accordance with the disclosed architecture.
Figure 7:
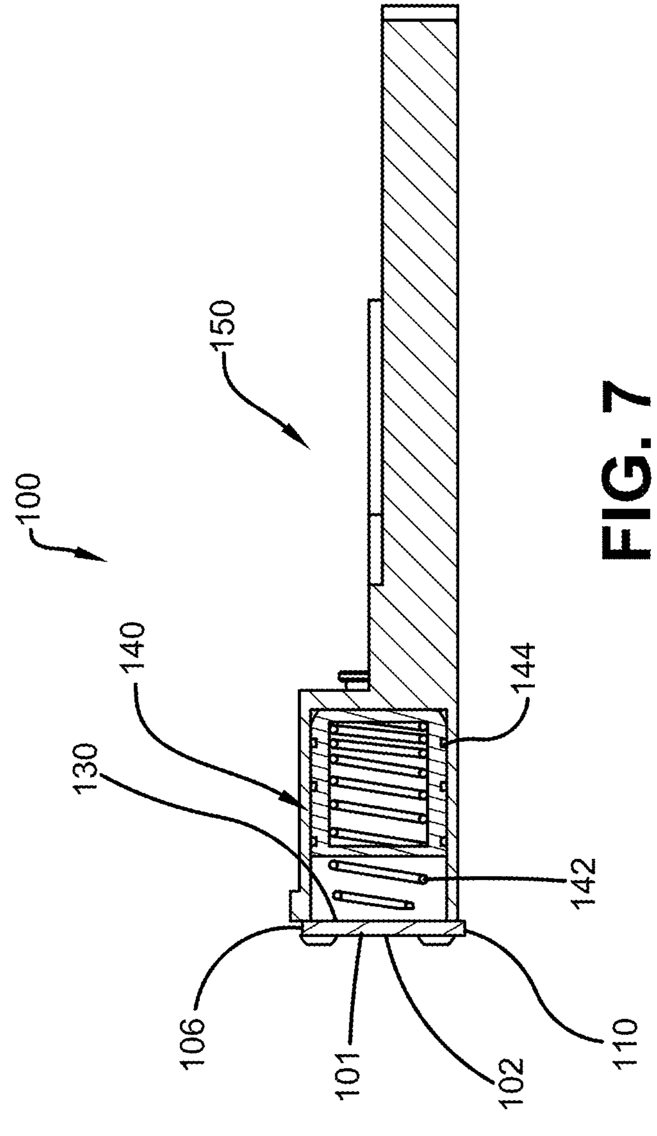
FIG. 7 illustrates a side cross-sectional view of one embodiment of the accumulator plate device of the present invention secured to the valve body in accordance with the disclosed architecture.

As illustrated in FIGS. 3 and 4, the valve body 150 comprises a lateral face 152 comprising a lip 154. The valve body 150 further comprises a plurality of bore holes 158 and a plurality of mounting holes 156 penetrating the lateral face 152. The lip 154 extends upward from the lateral face 152 above the level of the plurality of bore holes 158 creating a ridge. A plurality of accumulator assemblies 140 each comprise a spring 142 and a clutch accumulator piston 144. Each spring 142 is paired with one of the clutch accumulator pistons 144 to form a separate accumulator assembly 140. Each separate accumulator assembly 140 is then positional within one of the bore holes 158 in the lateral face 152 of the valve body 150 as illustrated in FIGS. 6 and 7.

The elongated plate body 101 comprises a front side 102, a back side 104, a top edge 106, a bottom edge 110, and a pair of side edges 108. The elongated plate body 101 is dimensioned to match the lateral face 152 of the valve body 150 with the back side 102 of the elongated plate body 101 configured to abut the lateral face 152 of the valve body 150. A thickness (W) of the elongated plate body 101 between the front side 102 and the back side 104 is thicker than the original equipment manufactured accumulator plate or the replacement accumulator plate 20. The increase in thickness improves structural integrity in the elongated plate body 101 when under spring pressure from the plurality of accumulator assemblies 140 impacting the back side 104 of the elongated plate body 101. The elongated plate body 101 is typically manufactured from steel, aluminum, or a similar metal or metal alloy.

The elongated plate body 101 further comprises a plurality of mounting holes 114 and a plurality of access openings 118. The plurality of mounting holes 114 are arranged to align with the plurality of mounting holes 156 in the valve body. The plurality of access openings 118 are located to allow visualization of the separate accumulator assemblies 140 within the bore holes 158.

Figure 5:
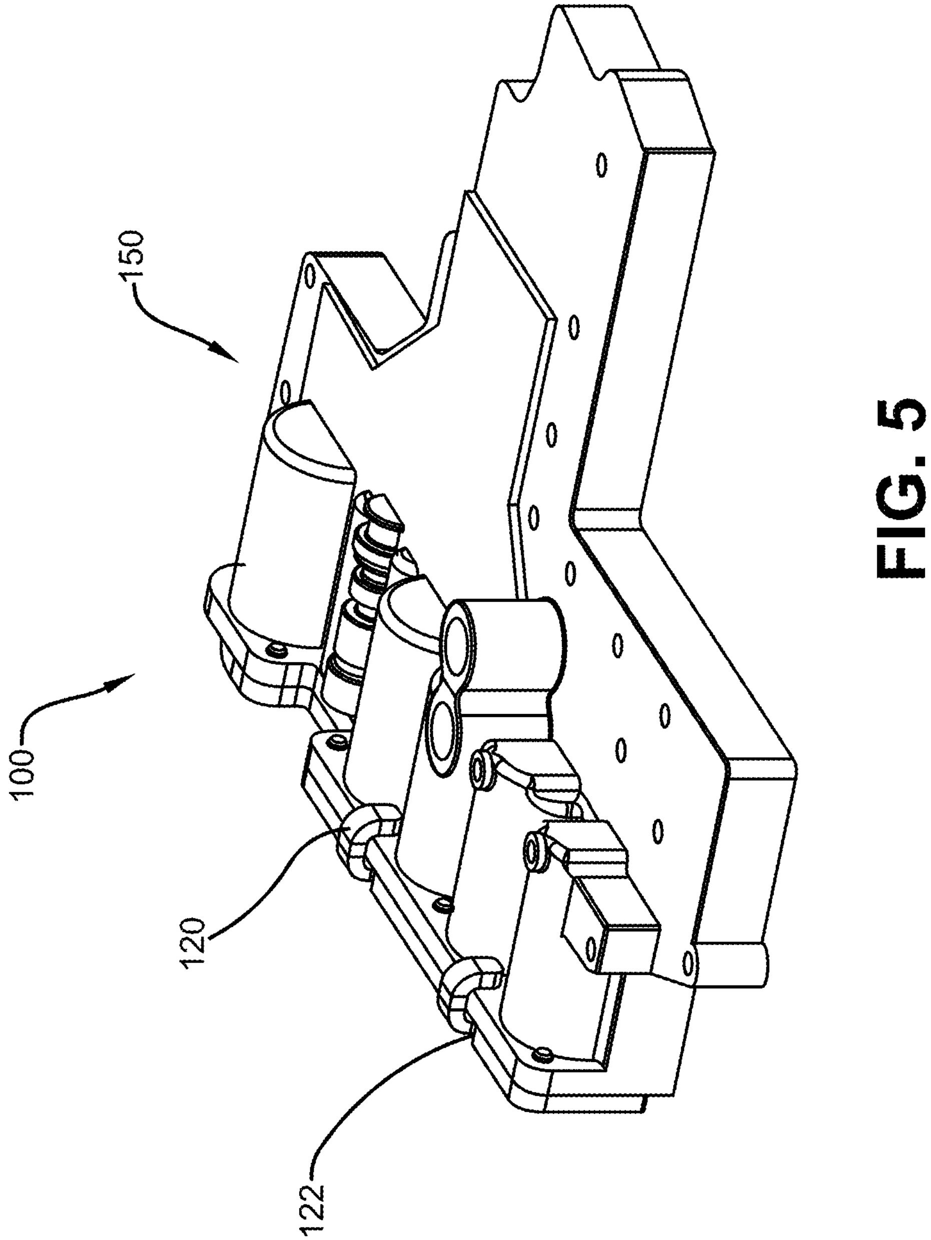
FIG. 5 illustrates a perspective view of one embodiment of the accumulator plate device of the present invention secured to the valve body in accordance with the disclosed architecture.

The plurality of hook members 120 extend out of the top edge 106 of the elongated plate body 101 at a plurality of hook member attachment points 122. At least one of the plurality of hook members 120 may alternatively extend out of one of the side edges 108. The plurality of hook members 120 are configured to fit over the lip 154 of the lateral face 152 of the valve body 150. The plurality of hook members 120 help secure the elongated plate body 101 to the lateral face 152 of the valve body 150 by supporting the elongated plate body 101 when pressures are applied from the springs 142 and the clutch accumulator pistons 144 held in a starting position within the piston bores 158. The plurality of hook members 120 prevent excessive deflection of the elongated plate body 101 by engaging the back side of the lip 154 as illustrated in FIG. 5.

The plurality of hook members 120 are two or more hook members that are either integrated directly into the top edge 106 of the elongated plate body 101, are welded to the top edge 106, or are otherwise formed from the top edge 106. The hook members 120 are configured to reduce flexion in the elongated plate body 101 at a plurality of stress points 130 in the elongated plate body 101 where each accumulator assembly 140 contacts the back side 104 of the elongated plate body 101. The plurality of hook members 120 may be any number and may be positioned anywhere along the top edge 106 or side edges 108 that would benefit from the increased reinforcement. In one embodiment, each of the plurality of hook members 120 is at least one inch apart. In another embodiment, each of the plurality of hook members 120 is located between the bosses housing each accumulator assembly 140.

The accumulator plate device 100 may further comprise a plurality of fasteners 116. The plurality of fasteners 116 are insertable within the plurality of mounting holes 114 of the elongated plate body 101. The plurality of fasteners 116 are then securable within the plurality of mounting holes 156 within the lateral face 152 of the valve body 150 to further secure the elongated plate body 101 to the lateral face 152 of the valve body 150. The plurality of fasteners 116 are typically machine screws or bolts. The combination of the plurality of fasteners 116 and the plurality of hook members 120 significantly decrease potential damage from mechanical stress to the elongated plate body 101 when under spring forces from the accumulator assemblies 140.

It is contemplated that the accumulator plate device 100 constructed in accordance with the present invention will be tailored and adjusted by those of ordinary skill in the art to accommodate various levels of performance demand imparted during actual use. Accordingly, while this invention has been described by reference to certain specific embodiments and examples, it will be understood that this invention is capable of further modifications. This application is, therefore, intended to cover any variations, uses or adaptations of the invention following the general principles thereof, and including such departures from the present disclosure as come within known or customary practice in the art to which this invention pertains and fall within the limits of the appended claims.

Notwithstanding the foregoing, the accumulator plate device 100 of the present invention and its various structural components can be of any suitable size, shape, and configuration as is known in the art without affecting the overall concept of the invention, provided that it accomplishes the above stated objectives. One of ordinary skill in the art will appreciate that the shape and size of the accumulator plate device 100 and its various components and material, as shown in the FIGS. are for illustrative purposes only, and that many other shapes and sizes of the accumulator plate device 100 are well within the scope of the present disclosure. Although the dimensions of the accumulator plate device 100 are important design parameters, the accumulator plate device 100 and its components may be of any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An accumulator plate device for use with a valve body of a transmission, the accumulator plate device comprising:

an elongated plate body comprising a front side, a back side, and a top edge; and a plurality of hook members extending out of the top edge of the elongated plate body at a plurality of hook member attachment points; and wherein the elongated plate body is securable to a lateral face of the valve body with the plurality of hook members configured to fit over a lip of the lateral face.

2. The accumulator plate device of claim 1, wherein the elongated plate body further comprises a plurality of mounting holes that align with a plurality of valve body lateral face mounting holes.

3. The accumulator plate device of claim 2 further comprise a plurality of fasteners for further securing the elongated plate body to the valve body via the plurality of mounting holes and the plurality of valve body lateral face mounting holes.

4. The accumulator plate device of claim 3, wherein the plurality of fasteners are machine screws.

5. The accumulator plate device of claim 1, wherein a thickness of the elongated plate body is greater than a thickness of an original equipment manufactured accumulator plate and a replacement accumulator plate.

6. The accumulator plate device of claim 1, wherein the plurality of hook members comprise two hook members.

7. The accumulator plate device of claim 1, wherein the plurality of hook members are integrated into the top edge of the elongated plate body.

8. The accumulator plate device of claim 1, wherein the plurality of hook members are welded to the top edge of the elongated plate body.

9. The accumulator plate device of claim 1, wherein at least one of the plurality of hook members is integrated into a side of the elongated plate body.

10. An accumulator plate device for use with a valve body of a transmission, the accumulator plate device comprising:

an elongated plate body comprising a front side, a back side, a top edge, a plurality of mounting holes, and a plurality of access openings; and a plurality of hook members extending out of the top edge of the elongated plate body at a plurality of hook member attachment points; and wherein the plurality of hook members are configured to engage a lip of a lateral face of the valve body to secure the elongated plate body to the lateral face of the valve body; and wherein a plurality of fasteners are employed to further secure the elongated plate body to the valve body via the plurality of mounting holes and a plurality of valve body lateral face mounting holes.

11. The accumulator plate device of claim 10, wherein a thickness of the elongated plate body is greater than a thickness of an original equipment manufactured accumulator plate and a replacement accumulator plate.

12. The accumulator plate device of claim 10, wherein the plurality of hook members are configured to reduce flexion in the elongated plate body at a plurality of stress points in the elongated plate body where a plurality of accumulator assemblies contact the back side of the elongated plate body.

13. The accumulator plate device of claim 12, wherein each accumulator assembly comprises a spring and a clutch accumulator piston.

14. The accumulator plate device of claim 10, wherein the plurality of hook members are integrated into the top edge of the elongated plate body.

15. The accumulator plate device of claim 10, wherein at least one of the plurality of hook members is integrated into a side of the elongated plate body.

16. The accumulator plate device of claim 10, wherein the elongated plate body is a steel plate.

17. An accumulator plate device for use with a valve body of a transmission, the accumulator plate device comprising:

an elongated plate body comprising a front side, a back side, a top edge, a plurality of mounting holes, and a plurality of access openings; and a plurality of hook members extending out of the top edge of the elongated plate body at a plurality of hook member attachment points; and wherein the plurality of hook members are configured to engage a lip of a lateral face of the valve body to secure the elongated plate body to the lateral face of the valve body; and wherein a plurality of fasteners are employed to further secure the elongated plate body to the valve body via the plurality of mounting holes and a plurality of valve body lateral face mounting holes; and wherein the plurality of hook members are configured to reduce flexion in the elongated plate body at a plurality of stress points in the elongated plate body where a plurality of accumulator assemblies contact the back side of the elongated plate body; and further wherein a thickness of the elongated plate body is greater than a thickness of an original equipment manufactured accumulator plate and a replacement accumulator plate.

18. The accumulator plate device of claim 17, wherein the plurality of hook members comprise at least three hook members.

19. The accumulator plate device of claim 17, wherein the plurality of hook members member attachment points are at least one inch apart.

* * * * *